A. M. Asay,
Molding Teeth.
N° 70,148.        Patented Oct. 29, 1867.

Witnesses
Thomas J. Bewley
Thomas T. Markland

Inventor
A Merritt Asay
Stephen Ustick Atty

United States Patent Office.

A. MERRITT ASAY, OF PHILADELPHIA, PENNSYLVANIA.

*Letters Patent No. 70,148, dated October 29, 1867; antedated October 15, 1867.*

---

IMPROVED MOULDS FOR ARTIFICIAL TEETH.

---

*The Schedule referred to in these Letters Patent and making part of the same.*

---

TO ALL WHOM IT MAY CONCERN:

Be it known that I, A. MERRITT ASAY, of the city and county of Philadelphia, and State of Pennsylvania, have invented a new and useful improvement in Moulds for Artificial Teeth; and I do hereby declare that the following is a full and exact description thereof, reference being had to the accompanying drawings, and to the letters of reference marked thereon.

The nature of my invention, in the first place, consists in constructing the moulds for forming artificial teeth of oblong depressions, for the reception of the bowed end of staples, for connecting the teeth to vulcanite or other plates, which constitute the base of the teeth; or for the reception of the projecting end of T or other headed plates, for the same purpose, the other end of the staples or plates, projecting into the mould, to be embedded in the plastic material for forming the teeth, known in the profession by the name of body. And in the second place, it consists in forming depressions for giving an increased amount of material at the ends of the sections, and between the teeth, to support the rim of the teeth; all of which will be understood by the following description. In the accompanying drawings, which form a part of this specification—

Like letters in all the figures indicate the same parts.

A is the drag or lower portion of the mould, which gives form to the inside or lingual surface of the teeth, and B is the cope or upper portion of the mould for giving form to the labial or front surface of the teeth. The drag A has two crown-pieces C C, which have indentations, to form the crowns of the bicuspid teeth D and the molar teeth E, the said pieces being held in their places by means of the key or wedge F. The crown-pieces are prevented from sliding endwise by means of the stationary pins $a$. When the teeth are to be removed from the mould, the key is withdrawn, and the crown-pieces C C moved toward the centre of the drag.

So far the construction and arrangement of the parts of the mould are in the usual manner. Therefore I deem a more detailed description unnecessary.

Figure 1:
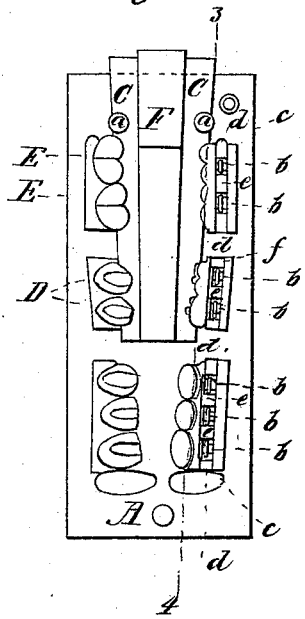
Figure 1 is the drag or lower part of the mould, containing on one side three sections of teeth, and on the other staples, inserted with their bowed ends in their depressions, for holding them in position while the teeth are formed.
Figure 2:
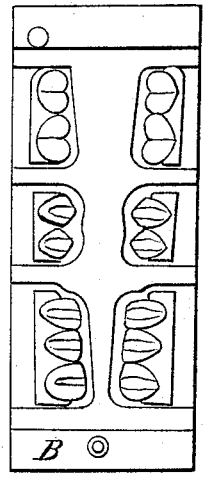
Figure 2 is the cope or upper part of the mould.
Figure 3:
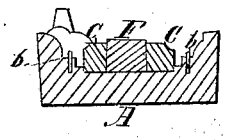
Figure 3 is a cross-section of the drag at the red line 1 2 of fig. 1.
Figure 4:
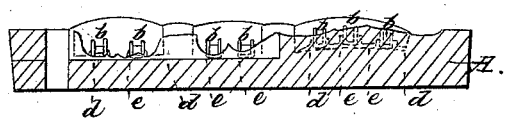
Figure 4 is a longitudinal section at the red line 3 4 of fig. 1.

For the reception of bowed ends of platinum staples $b$, as seen at one side of fig. 1, I form oblong depressions $c$ in the drag, either in the solid metal, or formed of different pieces. The depth of the impression is equal to the distance the end should project from the teeth for confining them to vulcanite or other plates, which constitute the base of the teeth. These depressions answer also for the insertion of the projecting end of T or other shaped plates that may be used instead of the staples. The headed or serrated ends of the staples or plates project far enough above the depressions to be sufficiently embedded in the plastic material known in the profession by the name of the body, in the formation of the teeth. When the teeth are made in sections of two or more, I form depressions $d$ at the ends of the sections, and depressions $e$ between the teeth, thus giving support to the rim $f$, and giving it increased strength to resist the force of mastication. When the teeth are made single, the depressions are also made at each edge, as seen in fig. 1.

What I claim as my invention, and desire to secure by Letters Patent, is—

1. Constructing the mould with oblong depressions $c$, for receiving and retaining the bowed end of the staples $b$, or end of plates which project from the lingual surface of the teeth, for confining them to vulcanite or other plates.

2. The depressions $d$ and $e$, constructed and arranged substantially as described, for giving increased strength to the rim $f$, substantially as set forth.

In testimony whereof I have hereunto set my hand and affixed my seal this 13th day of February, 1867.

A. MERRITT ASAY. [L. S.]

Witnesses:
 STEPHEN USTICK,
 THOMAS J. BEWLEY.